(12) United States Patent
Winters

(10) Patent No.: US 9,864,872 B2
(45) Date of Patent: Jan. 9, 2018

(54) METHOD FOR MANAGING PRIVACY OF DIGITAL IMAGES

(71) Applicant: Monument Peak Ventures, LLC, Plano, TX (US)

(72) Inventor: Dustin L. Winters, Webster, NY (US)

(73) Assignee: MONUMENT PEAK VENTURES, LLC, Plano, TX (US)

( * ) Notice: Subject to any disclaimer, the term of this patent is extended or adjusted under 35 U.S.C. 154(b) by 0 days.

(21) Appl. No.: 15/398,924

(22) Filed: Jan. 5, 2017

(65) Prior Publication Data
US 2017/0177887 A1    Jun. 22, 2017

Related U.S. Application Data

(62) Division of application No. 14/340,707, filed on Jul. 25, 2014, now Pat. No. 9,552,483, which is a division of application No. 12/789,525, filed on May 28, 2010, now abandoned.

(51) Int. Cl.
| | |
|---|---|
| G06F 21/62 | (2013.01) |
| H04L 29/06 | (2006.01) |
| G06F 17/30 | (2006.01) |
| H04N 1/00 | (2006.01) |

(52) U.S. Cl.
CPC .... *G06F 21/6209* (2013.01); *G06F 17/30265* (2013.01); *H04L 63/101* (2013.01); *H04L 63/107* (2013.01); *H04N 1/00137* (2013.01); *H04N 1/00156* (2013.01); *H04N 1/00244* (2013.01)

(58) Field of Classification Search
CPC .......... G06F 21/6209; G06F 17/30265; H04L 63/101; H04L 63/107; H04N 1/00156; H04N 1/00137; H04N 1/00244
See application file for complete search history.

(56) References Cited

U.S. PATENT DOCUMENTS

| | | | | |
|---|---|---|---|---|
| 2004/0183674 A1* | 9/2004 | Ruvarac | ............ | G08B 21/0269 340/539.13 |
| 2010/0009698 A1* | 1/2010 | Yang | ................. | G06F 17/30241 455/456.3 |
| 2010/0127919 A1* | 5/2010 | Curran | .................. | H04W 4/021 340/573.4 |
| 2012/0078898 A1* | 3/2012 | Kononenko | ...... | G06F 17/30041 707/736 |

* cited by examiner

*Primary Examiner* — Mekonnen Dagnew
(74) *Attorney, Agent, or Firm* — Ascenda Law Group, PC

(57) ABSTRACT

A captured digital image is stored in memory together with metadata derived from a location signal only if the location metadata is determined not to be within one or more predefined exclusion zones. A GPS receiver module can be implemented to obtain the location signal.

20 Claims, 7 Drawing Sheets

600

METHOD FOR MANAGING PRIVACY OF DIGITAL IMAGES

CROSS-REFERENCE TO RELATED PATENT APPLICATIONS

This application is a Divisional of U.S. patent application Ser. No. 14/340,707, filed Jul. 25, 2014, now U.S. Pat. No. 9,552,483, which is a Divisional of U.S. patent application Ser. No. 12/789,525, filed May 28, 2010, incorporated herein by reference in their entireties

FIELD

The present disclosure relates to a method for managing a collection of digital image files.

BACKGROUND

Today, through use of digital cameras, consumers are able to easily capture and store large collections of personal digital images. These image collections can be stored either locally on a personal computing device or stored remotely on an online photo-management service such as Kodak Gallery, which are capable of maintaining digital image collections for a large number of users and enable users to share their digital images with other users via the internet.

Digital images are composed of pixel data which is used to render a two dimensional digital image on an electronic display or in printed hard copy form. In addition to pixel data, digital images often further include metadata which is data related to and associated with the digital image. Metadata is often useful for organizing and searching of digital images. Some metadata can be provided automatically when the image is first captured by a digital camera device, such as for example, capture date and time metadata. Other types of metadata may include metadata entered by the user such as a caption or 'favorite' designation. Other types of metadata may be provided by photo-management software such as a last edited date and time. Another example of metadata is people tag metadata identifying one or more people appearing in the digital image. People tag metadata can be entered either manually by a user or automatically by photo-management software, for example by using facial recognition algorithms.

Another type of metadata which can be associated with digital images is location metadata, such as longitude and latitude coordinate metadata. Location metadata may similarly be provided at the time the image is captured, for example by a digital camera device with a Global Positioning System (GPS) sensor. Alternately, a user may manually enter location metadata at some time after the image has been captured. Location metadata is also useful for organizing a collection of digital images. For example, commonly assigned U.S. Pat. No. 6,883,146 describes a graphical user interface (GUI) system for browsing and retrieving digital images by location. This patent is incorporated herein by reference in its entirety.

However, some users do not always want their digital images to include location metadata. Particularly, a user may wish to not include location metadata when sharing digital image files with other users or when publishing digital images publically, for example on an internet website. Users might, for example, want to publish an image captured at their home, but not necessarily provide the precise latitude and longitude coordinates of their home address.

In order to address this concern, some GPS-enabled cameras provide the ability to disable the location metadata feature so that metadata is not automatically saved every time a picture is captured. However, if the user wants some digital images to include the location metadata and others to not include the location metadata, the user must remember to turn on and off this setting prior to taking each picture. Alternately, the user may use photo-management software currently available to remove the location metadata prior to sharing or publishing each digital image. However, the user must also remember to do this and may not always be aware which digital images in his or her collection include such location metadata. Alternately, some photo-management services allow a user to specify privacy based on which other users can view location metadata for one or more pictures. However, the user must again actively manage which photos have location information shared for each image or group of images where the user wishes to have privacy. As a result, these known methods of addressing the privacy concern with location metadata can result in some images undesirably being shared or published with location metadata or some images undesirably captured without location metadata. An improved system for managing the privacy of digital images having location metadata is therefore desired.

SUMMARY

A preferred embodiment of the present disclosure comprises a method of storing a digital image including capturing an image signal from an image sensor and receiving a location signal associated with the captured image signal. A digital image file derived from the image signal is stored in memory. Metadata derived from the location signal is stored in association with the digital image only if the location metadata is determined not to be within one or more predefined exclusion zones. A GPS receiver module can be implemented to obtain the location signal. The exclusion zones are also stored in a memory apparatus. Alternatively, the digital image is stored in a second digital memory different from the memory storing the exclusion zones. The digital memory can be removable memory.

Another preferred embodiment of the present disclosure includes a method of controlling access to a digital image comprising providing to a system processor a digital image stored in a digital memory, wherein the digital image is logically associated with capture location data. Exclusion location data is also provided to the processor, which is logically associated with a receiver. The processor then determines a relationship between the capture location data and the exclusion location data, and transmits the digital image and the capture location data to the receiver if the determined relationship between the capture location data and the exclusion location data is of a first type. Second exclusion location data provided to the processor can be treated differently if the processor determined relationship between the capture location data and the second exclusion location data indicates that the relationship is of a second type. In that case, only the digital image will be transmitted. In the context of a preferred embodiment of the present disclosure, a receiver is typically a requesting node but need not be a source of a request. Similarly, the receiver can be indirectly associated with a requesting user, a "requestor," communicating a request message over the network. The request may originate elsewhere in the network, by a separate requestor, and identify another node as a receiver of the digital image. A node can include a computer, a communication device, or a human user at the network node who is using the computer or communication device. Thus, it should be noted that the receiving node can be the same node as the requesting node or it can be a different node.

Another preferred embodiment of the present disclosure includes a method for displaying digital images having location metadata associated therewith. The method includes retrieving from a memory a digital image file associated with a first user and geographic location metadata for the digital image file. Then, geographic exclusion zones associated with the first user are retrieved from the memory. Displaying digital image data from the digital image file depends on whether the geographic location of the location metadata is not within any of the one or more geographic exclusion zones.

Another preferred embodiment of the present disclosure includes a method for transmitting digital images with location metadata between a plurality of users including proving a database having a plurality of users, receiving a digital image file from a first user, receiving geographic location metadata for the digital image file, receiving one or more geographic exclusion zones associated with the first user, transmitting digital image data to a second user, and transmitting the geographic location metadata of the digital file to the second user if the geographic location of the location metadata is not within any of the one or more geographic exclusion zones. At least a portion of the transmitted digital image data and at least a portion of any transmitted geographic location metadata of the digital image file can be stored on a digital electronic storage memory device.

Another preferred embodiment of the present disclosure includes a method for displaying digital images with location metadata, including storing in an electronic memory a digital image file associated with a first user, storing in an electronic memory geographic location metadata for the digital image file, storing one or more geographic exclusion zones associated with the first user, transmitting digital image data to a computer associated with a second user, and transmitting the geographic location metadata of the digital file to the computer associated with the second user only if the geographic location of the location metadata is not within any of the one or more geographic exclusion zones.

Another preferred embodiment of the present disclosure includes a method for displaying digital images with location information, including storing in an electronic memory a digital image file associated with a first user, storing geographic location metadata for the digital image file, storing at least one geographic exclusion zone associated with the first user, storing a list of users with access rights to the at least one geographic exclusion zone, transmitting digital image data to a computer associated with a second user, and transmitting the geographic location metadata of the digital file to the computer associated with the second user only if the geographic location of the location metadata is not within any of the one or more geographic exclusion zones or if the second user is among the list of users with access rights to the at least one geographic exclusion zone.

These, and other, aspects and objects of the present disclosure will be better appreciated and understood when considered in conjunction with the following description and the accompanying drawings. It should be understood, however, that the following description, while indicating preferred embodiments of the present disclosure and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present disclosure without departing from the spirit thereof, and the disclosure includes all such modifications. The figures below are intended to be drawn neither to any precise scale with respect to relative size, angular relationship, or relative position nor to any combinational relationship with respect to interchangeability, substitution, or representation of an actual implementation.

DETAILED DESCRIPTION OF THE PREFERRED EMBODIMENTS

Figure 1:
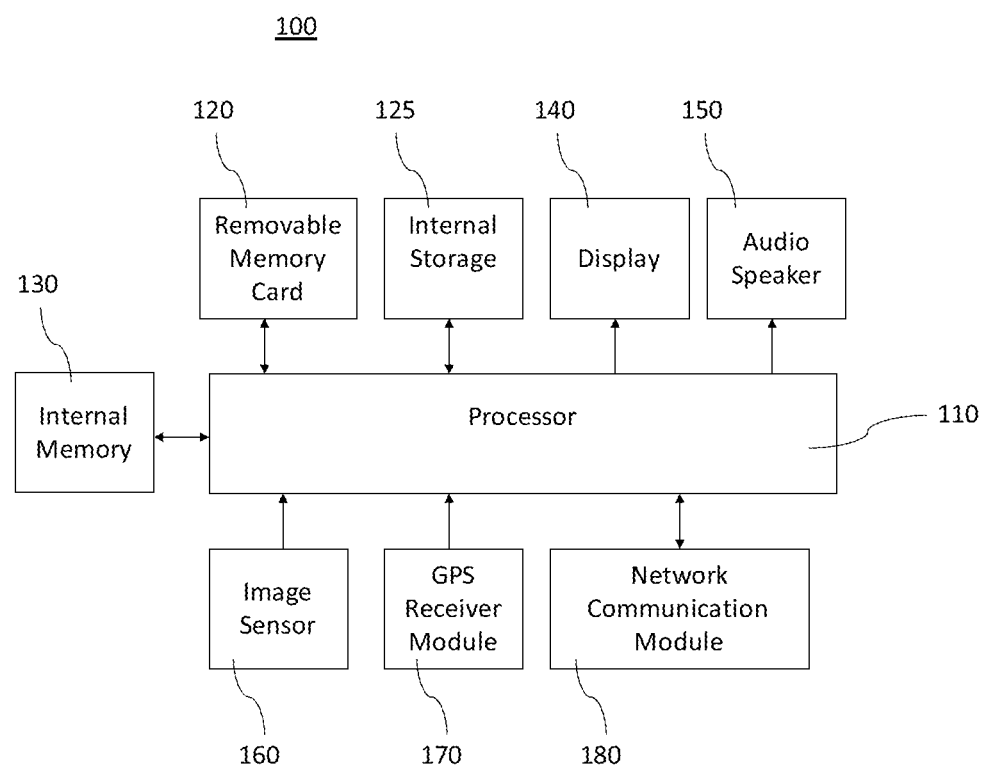
FIG. 1 is a block diagram illustrating the comments and systems of a digital camera device for use with the present disclosure.

In the following description, some embodiments of the present disclosure will be described in terms that would ordinarily be implemented as software programs. Those skilled in the art will readily recognize that the equivalent of such software may also be constructed in electronic hardware. Because image manipulation algorithms and systems are well known, the present description will be directed in particular to algorithms and systems forming part of, or cooperating more directly with, the method in accordance with the present disclosure. Other aspects of such algorithms and systems, together with hardware and software for producing and otherwise processing the image signals involved therewith, not specifically shown or described herein may be selected from such systems, algorithms, components, and elements known in the art. Given the system as described according to the disclosure in the following, software not specifically shown, suggested, or described herein that is useful for implementation of the disclosure is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present disclosure.

The disclosure is inclusive of combinations of the embodiments described herein. References to "a particular embodiment" and the like refer to features that are present in at least one embodiment of the disclosure. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The term digital image is used herein to include still digital image files or video digital image files. Digital images may further be arranged into groups such as albums or events. These still digital image files, video digital image files, album groups, and event groups, are collectively referred to herein as digital image assets. Each of these types of digital image assets may have associated metadata entered by the user or automatically provided by a capture device or otherwise provided by photo-management software. For example, an album or event collection of digital images may have metadata which describes the digital images contained within that collection. Such metadata is considered as being associated with the album or event collection and therefore also associated with each of the still digital image files and video digital associated with that album or event collection.

The present disclosure uses location metadata. Location metadata can take a variety of forms including geographical longitude and latitude coordinates. Location metadata can also take other forms such as a street address or a place name (i.e. "Rochester, New York", "Yankee Stadium", etc. . . . ). Location metadata can also take other forms such as the identity of a nearby fixed point such as a network node, cellular communication tower, Radio Frequency (RF) transmitter, or the like.

The preferred embodiments of the present disclosure operate as part of, or in connection with, a multi-user online photo-management service. On-line photo-management services enable users to share digital images over a network such as the internet. Such photo-management services store digital images on a network server. Photo-management services may also optionally provide the user with the ability to order hardcopy prints or other photo goods (such as photobooks, calendars, greeting cards, mugs, t-shirts, and the like), although this capability is not required to successfully practice the present disclosure. Kodak Gallery is an example of online photo-management service currently available. Several of the methods of the present disclosure can also be applied to on-line social network services that enable users to upload and share collections of digital media assets with other users. Such social networking services which enable users to manage and share digital media assets are herein also considered to be an online photo-management service. With such a social networking website, each individual user has an associated online account that can be linked to accounts for other users known to the user. When users upload digital media assets to their respective accounts, other users who are identified as "friends" or who are within a common "network" with the uploading user can view the digital media assets, depending on any additional sharing or privacy restrictions. In some cases, the users of such social network sites or online photo-management services have the option to manually tag the digital media assets with metadata which identifies persons contained in the digital media assets, although this ability is also not required for successful implementation of the present disclosure.

In the preferred embodiments, the online photo-management service includes at least one network server, connected and accessible via the internet by means of a Uniform Resource Locator (URL). Alternately, the online photo-management service can be supplied by way of a personal network or intranet or another private, non-public, or privately managed network system such as a cellular telephone network. Alternately, one skilled in the art may apply the present disclosure to a service that operates over a distributed or peer-to-peer collection of servers or file-sharing programs and devices.

In the preferred embodiments, the photo-management service server(s) includes a central processing unit (processor) for executing instructions and a network interface unit for interfacing with a communication network such as the internet. The server also includes a user database for storing information, including access information such as a username and password, for a plurality of users. The photo-management service preferably further includes one or more non-volatile digital storage memory devices, such as hard disk drives, for storing a plurality of digital images provided by the users. The photo-management service further preferably includes an image database for managing metadata associated with the digital images as well as for information about users of the photo-management service. The user database or image database may include data written on the non-volatile digital storage memory devices.

One skilled in the art will understand that the user database and image database could be constructed as a plurality of database tables in single database or from a plurality of connected databases. The database(s) could be stored on a single hard drive or multiple hard drives, or could operate on the one or more servers. Preferably the database(s) operate using Structured Query Language (SQL) which is presently available in many commercial products, such as the MySQL software, or the like. Alternately, one skilled in the art can construct the database search and retrieval functionality in custom software and can store the database information in one or more computer files. Such custom data storage and retrieval programs are considered a type of database for purposes of the present disclosure.

Each user accesses the online photo-management service by way of an access device. A wide variety of access devices for connecting to online services which are currently available can be employed, including, but not limited to; a personal computer (PC) with a modem or network card, a mobile phone with internet access, a digital camera device with internet access, a digital photo frame with internet access, a video gaming counsel with internet access, a set-top box or digital media player device with internet access, or the like. The access device preferably includes; a central processing unit (processor) for executing instructions, a volatile memory for use by the processor, a network interface unit, an input device such as a mouse, a keyboard, a touch screen, a remote control, a pointer device or the like, and a display device, for example an LCD screen, or display output connection for outputting to an external display device. The user access device may also optionally include an image sensor, such as a CMOS or CCD type image sensor array, for capturing digital images as well as a non-volatile storage memory such as a flash memory or magnetic hard disk or the like for storing digital image files.

Each user is provided a user account on the photo-management service having an associated user name and password. The user is considered the 'owner' of this account and is provided with privileges to specify account settings for that account. The user is also provided with access to information, such as the digital images, associated with the accounts owned by other users as will be described in further detail below.

Turning now to FIG. 1, a block diagram detailing the internal components of a mobile electronic digital camera 100 for use with the present disclosure will be described. The digital camera 100 includes a central processor 110. The processor may be constructed using a single application specific integrated circuit (ASIC) or a plurality of ASIC's connected together to execute the processing instructions and functionality of the camera as described herein. The processor 110 executes one or more of the instructions associated with the steps of the method described in more detail below. The digital camera 100 further preferably includes removable memory card 120. The removable memory card 120 is constructed with a non-volatile memory such as flash memory. Removable memory card 120 is in electrical communication with processor 110 and serves to store digital images captured by the digital camera. Digital camera includes internal storage memory 125 which is also preferably also of a non-volatile memory type such as flash memory, but may be chosen from various types of internal storage memory such as a magnetic hard-drive. Internal storage memory 125 is preferably integral to the digital camera 100 device and not removable by the user. Internal storage memory 125 serves to save setting information including settings related to the user, the camera, a network connection, and the like. Internal storage memory 125 may also serve to store digital images captured by the digital camera, particularly at times when the removable memory card 120 has been removed, is full, or is otherwise unavailable. Digital camera 100 further includes an internal memory 130, preferably constructed of a volatile memory such as Dynamic Random Access Memory (DRAM). Internal memory 130 is in electrical communication with processor 110 and is used by processor 110 for storing data while executing instructions according the methods of the current disclosure. Digital camera 100 further includes an electronic display 140 for displaying digital images and other information to a user. Electronic display 140 is preferably a Liquid Crystal Display (LCD) type display and is in electrical communication with processor 110. The electronic display is preferably also coupled to a touch screen sensor. Alternately or in combination, other type of input devices such as a joy-stick controller (not shown) may be employed. Digital camera 100 also preferably includes an audio speaker 150 for communicating audio information to the user. Audio speaker 150 is in electrical communication with processor 110. Digital camera 100 further includes image sensor 160 for capturing and digitizing photographic images. Image sensor 160 is preferably of the Complimentary Metal Oxide Semiconductor (CMOS) image sensor type or Charge Couple Device (CCD) type. Image sensor 160 is in electrical communication with processor 110 and transmits the digitized images to the processor. Digital camera 100 further includes Global Positioning System (GPS) receiver module 170 which receives location data from the global positioning system. GPS receiver module 170 is in electrical communication with processor 110 and transmits the location data to processor 110 for use in executing the instructions of the methods of the present disclosure. As such, the GPS module of this embodiment can be any type of location receiver module that detects a location based on a signal transmitted from the GPS Satellite system. Alternate types of location receiver modules adapted to receive location signals from other sources may also be used with the present disclosure. Digital camera 100 preferably further includes network communication module 180 for communicating with an electronic communication network such as a WiFi network or a cellular network. Network communication module 180 is in electrical communication with processor 110 and sends and receives information to the processor for executing instructions according to the methods of the present disclosure. Processor 110, removable memory card 120, internal memory 130, display 140, audio speaker 150, image sensor 160, GPS receiver module 170, and network communication module 180 are components currently available and one skilled in the art may select and configure such components to successfully practice the present disclosure.

Figure 2:
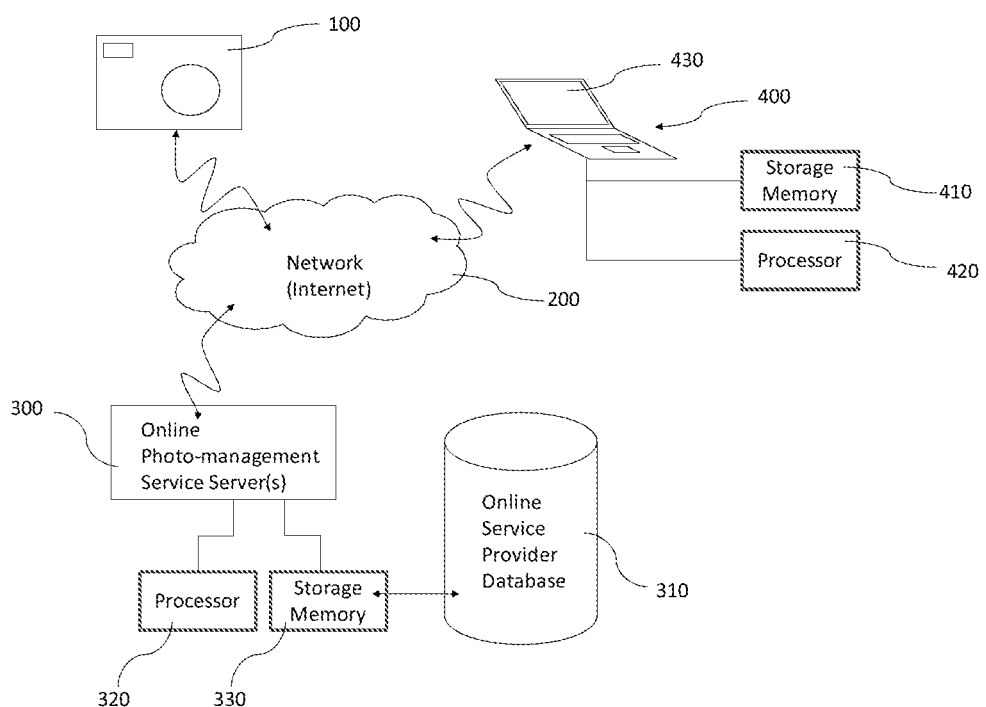
FIG. 2 is an illustration of the network system for communication between devices of the present disclosure.

Turning now to FIG. 2, the figure shows an illustration of a communications device according to multiple embodiments of the present disclosure. Digital camera 100 is in communication with network 200, such as the internet using the network communication module described above. Communication to the network may be achieved through the use of a network service provider (not shown). Online photo-management service 300 is also in communication with the network 200. Online photo-management service 300 includes one or more servers having processor(s) 320 (central processing units) and at least one storage memory 330, such as a magnetic hard disk, for executing server programs and functions, for receiving and transmitting network communications, for storing digital images files, metadata, other user information, as well as any HTML and PHP files needed to access the service. Online photo-management service 300 includes a database 310 for managing a plurality of users and associated digital image files. Database 300 preferably includes a plurality of tables for managing users and digital images files as will be described in more detail below. Digital camera 100 can transmit digital images to the online photo-management service 300 by way of network 200.

One or more computer access devices, such as computer access device 400, may also access the online photo-management service 300 by way of network 200 in order to access digital images stored there. The computer access device also includes a processor 410, or central processing unit (CPU), and preferably includes its own storage memory 420, such as a hard drive. The computer access device 400 also includes a digital electronic display device 430 which can be of the Liquid Crystal Display (LCD) type or the like for the displaying of digital images and graphic user interfaces. The computer access device also includes a network interface unit (not shown) such as a network interface card or wireless network adaptor for connecting to network 200.

Figure 3:
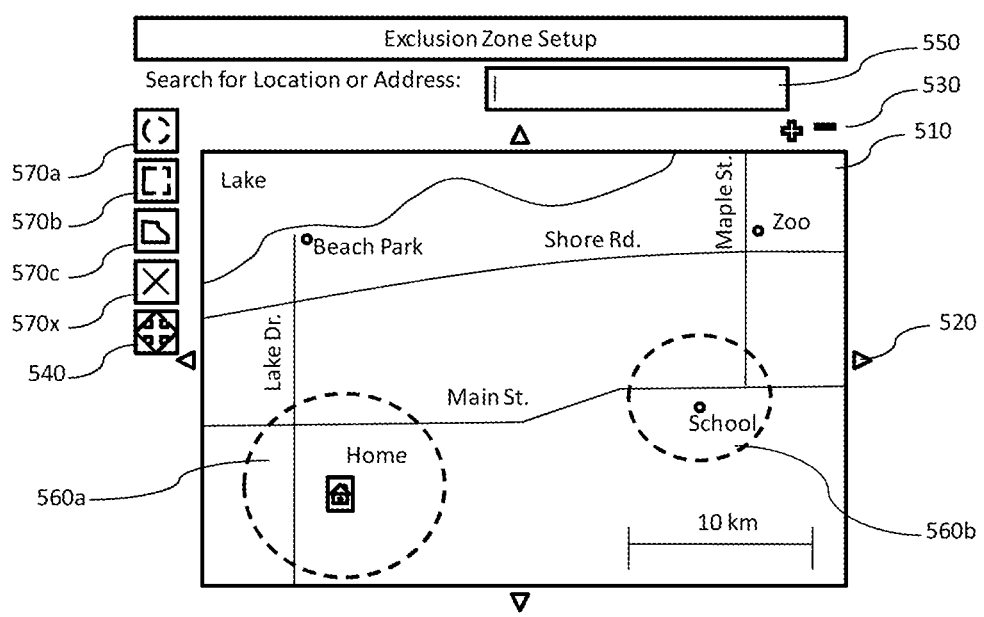
FIG. 3 is an illustration of a graphical user interface for entering exclusion zones according to the present disclosure.

Turning now to FIG. 3, a graphic user interface 500 according to the present disclosure is shown and will now be described with continued reference to FIG. 1 and FIG. 2. Graphic user interface is provided to enable the user to enter one or more geographic exclusion zones according to the present disclosure. Graphic user interface 500 may be generated in the digital camera 100 and displayed on the display 140 of the digital camera. In an alternate embodiment the graphic user interface 500 may be generated by the online photo-management service 300 and made available to a user over network 200 through, for example, a web-browser interface. In yet another alternate embodiment, the graphic user interface may be generated by software loaded on to a personal computer which is either connected to digital camera 100 directly, can receive removable memory cards from digital camera 100, or can communicate with digital camera through a network such as computer access device 400 connected to network 200.

Graphic user interface 500 contains a map region 510. Map region 510 displays maps which may be either preloaded into memory or may be downloaded from an online map service provider over the network. Graphic user interface 500 also contains several controls to enable the user to navigate to different locations such as scroll arrows 520, zoom in and out controls 530, pan control 540, and location search input box 550. The graphic user interface 500 enables the user to designate one or more exclusion zones such as exclusion zone 560*a*, for example designated around the user's home, and exclusion zone 560*b* for example designated around a nearby school. Exclusion zones may be designated at varying sizes and shapes and it is not necessary that all exclusions be visible simultaneously on the map region 510. Designation control 570*a*, designation control 570*b*, and designation control 570*c* are exemplary controls for designating round, rectangular, and free-form shaped exclusion zones respectively. The user selects one of these controls and the draws the exclusion zone on the map region 510 using an input device, such as a touch screen or the like. Deletion control 570*x* is provided to enable the user to delete previously created exclusion zones as desired.

In order to facilitate the entering of rectangular or free-form shaped exclusion zones, it is preferable that the map region 510 be made to display a flat representation of the Earth, without wrapping around the 180 degree meridian including the north and south pole. For example, the map region will not scroll 'up' past the north pole, 'down' past the south pole, or left or right past the 180 degree meridian. In this way, there is no ambiguity as to which area specified by the user is the 'inside' area versus the 'outside' area for free-form shapes. This map arrangement will be referred to herein as a "non-wrapping map" arrangement. This further facilitates later calculations when determining whether a given point is inside or outside the exclusion zone. Alternately, a continuous globe shaped map region may be used. This alternate arrangement will be referred to herein as a "wrapping globe arrangement". In this case, the user should be asked as to which region is the inside of the region, for example, by asking the user to select a point within the region. Even in this case, it is preferable that no side of the polygon be allowed to exceed half of the circumference of the Earth.

Figure 4:
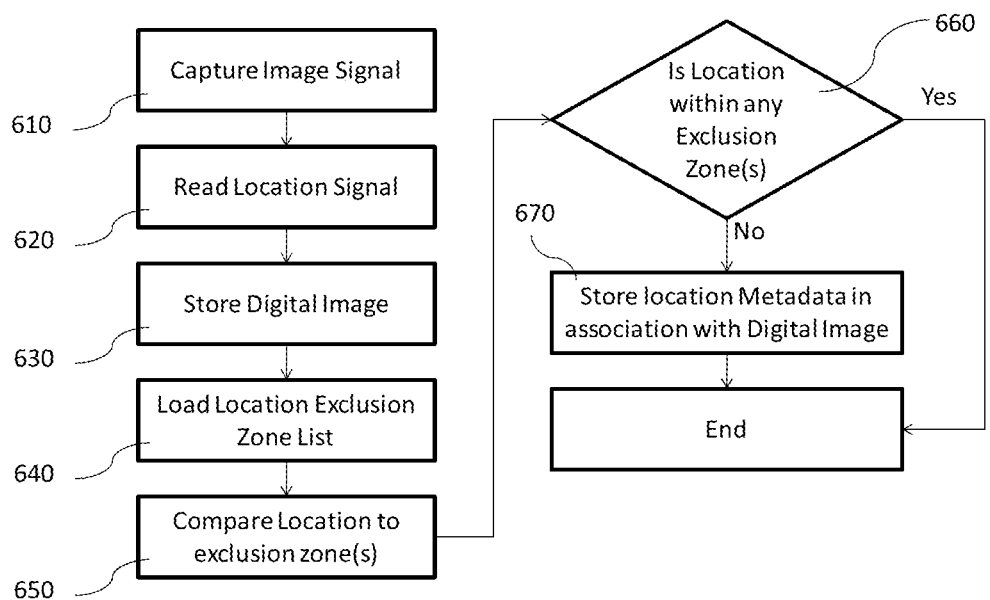
FIG. 4 is a flow chart of a process for sharing digital image files according to a first embodiment of the present disclosure.

Turning now to FIG. 4 and with reference to FIG. 1 to FIG. 3, a first embodiment of the present disclosure will now be described. In this first embodiment, digital camera 100 stores a list of exclusion zones in internal storage memory 125. The exclusion zones are created using graphic user interface 500 as previously discussed. This can be done either on the camera using the camera display 140 and processor 110, or on a personal computer or on the photo-management service and loaded onto digital camera 100. The resulting exclusion zones are preferably stored in a table in internal storage memory 125. This table is illustrated here as table 1:

exclusion zone list table includes a "ZoneID" primary key field for uniquely identifying each exclusion zone. The table also includes a "Caption" field to allow the user to identify each exclusion zone. The "CenterPoint" field and "Radius" field are used to store the center-point geographic coordinates of exclusion zones defined using designation control 570*a*. Alternately, the "NW" and "SE" fields are used to define the northwest and southeast coordinates of a rectangular exclusion zone defined using designation control 570*b*. Finally, the "FreeForm" field is used for storing a series of coordinates of a polygonal shaped exclusion zones defined using designation control 570*c*. In the alternate "wrapping globe arrangement" previously described, the "CenterPoint" field could also alternately be used for free-form and rectangular exclusion zones to define a point within the exclusion zone.

According to the first embodiment of the present disclosure, digital camera executes process 600 of FIG. 4 when capturing a digital image. Process 600 includes step 610 where a digital image signal is captured using image sensor 160. A location signal for the captured digital image is read at the time of capture per step 620 using GPS receiver module 170 and is stored in internal memory 130. In step 630 the digital image signal is converted into a digital image file by processor 110 and stored in memory, such as removable memory card 120. In step 640 the processor loads the exclusion zone list shown in table 1 from internal storage memory 125. In step 650 the location signal acquired during step 620 is compared to each of the exclusion zones loaded during step 640.

For purposes of determining if the image location is within a circular exclusion zone, the Haversine formula (see Equation 1 below) for calculating a great circle distance can be used. This simplified formula ignores altitude or depth, which are also not recorded as metadata in preferred embodiments thereby reducing the amount of data which needs to be stored. Therefore, a constant altitude, such as an approximate sea level is assumed. In this case the average radius of the Earth of approximately 6367.5 km can be used. This can result in small in accuracies when calculating distance, however, such inaccuracies are small enough to be neglected by the users for purposes of the present disclosure. The simplified equation also assumes that the Earth is perfectly spherical, ignoring the fact that the Earth's radius is slightly larger at the equator than at the poles. This assumption simplifies the processing thereby improving speed of the processing and reduced storage space for the processing instructions. Other known formulas for calculating distance can be employed by one skilled in the art, including the spherical law of cosines. Alternately, more

TABLE 1

In-Camera Exclusion Zone List Table

| ZoneID | Caption | CenterPoint | Radius | NW | SE | Freeform |
|---|---|---|---|---|---|---|
| 1 | Home | 43.152421, −77.579979 | 5 | | | |
| 2 | School | 43.157980, −77.601628 | 3.5 | | | |
| 3 | Grandma's House | | | 43.204381, −77635504 | 43.201842, −77.626791 | |
| 4 | Work | | | | | 43.161828, −77.620030; |
| | | | | | | 43.158682, −77.615778; |
| | | | | | | 43.156601, −77.620723; |
| | | | | | | 43.159040, −77.623894 |

The example of table 1 shown here is populated with four exemplary records of data for purpose of illustration. The complex embodiments of the present disclosure can be implemented by one skilled in the art by recording altitude and accounting for altitude in the distance equation and/or by using non-spherical Earth models.

$$d = 2 \times R \times \arcsin\left(\min\left(1 \cdot \sqrt{\sin^2\left(\frac{lat_2 - lat_1}{2}\right) + \cos(lat_1) \times \cos(lat_2) \times \sin^2\left(\frac{lon_2 - lon_1}{2}\right)}\right)\right) \quad \text{Equation 1}$$

In Equation 1, lat1 and lon1 are the latitude and longitude respectively of the of the exclusion zone center point, lat2 and lon2 are the latitude and longitude respectively of the location of the digital image, and R is the radius of the earth or 6367.5 km. Longitude and Latitude are preferably converted from degrees to radians. The minimum ("min") function assures that the arcsine function is not provided with a value greater than 1. The distance returned by the equation is compared to the specified radius of the exclusion zone from table 1 and if less than said radius, the location is considered to be within the exclusion zone.

For rectangular exclusion zone, the calculation is simply determined by whether the longitude of the location of the digital image is between the longitude of the NW and SE coordinates of the rectangular exclusion zone and the latitude of the location of the digital image is between the latitude of the NW and SE coordinates of the rectangular exclusion zone. It should be noted that these 'rectangular' exclusion zones only appear rectangular when viewed on a flattened display map but are actually relating curved geographical surfaces.

For freeform polygon shaped exclusion zones, determining if the location is within the polygon can be achieved using known methods of determining if a point is within a polygon based on the Jordan curve theorem. These methods involve counting how many edges of the polygon are crossed by a line starting from the location of the digital image to a reference point. For the non overlapping map arrangement previously described, the path between the digital image location and a reference point at the north pole (90,0) may be used. Crossing an even number (including zero) of edges indicates that the location is outside of the exclusion zone, while crossing an odd number of edges indicates that the location is within of the exclusion zone. Alternately, for the wrapping globe arrangement, the number of edges crossed for a line traveling between the location of the digital image to the reference point within the exclusion zone will be an even number (including zero) if the location is within the exclusion zone, or an odd number of crossing if the location is outside of the exclusion zone.

For the present disclosure, the occurrence of an edge crossing can be determined using the following procedure. Each edge of the polygon with its starting and ending point forms a great arc, which is a portion of a great circle around the sphere. Likewise, the great arc between the image location and the reference point is a portion of another great circle. The intersections of these great circles are determined using known mathematical techniques. This will result in two intersection points which are antipodal. Next, it is calculated whether either of these intersection points are contained within both of the great arcs. Since the polygon sides are preferably limited to less than half the circumference of the Earth as previously described, only one of the antipodal intersection points can be on the great arc path of the edge. One technique for performing this test is to calculate the great arc distance using the Haversine formula, as described above, between the great circle intersection point and the start and end points of each arc. If each of these great arc distances are less than the total great arc distance of the entire arc and also less than one half of the circumference of the earth, then the intersection point lies within the great arc. If the intersection point is within both great arcs, then that edge is crossed. In the special case where an intersection point is exactly equal to a polygon vertex, then it is unknown as to whether the image location to reference point line crosses into the polygon or not. One method to work around this case is to temporarily shift the polygon vertex by a small amount (such as 0.000001 degrees) when an intersection with a vertex is detected and recalculate the intersection point. The process is repeated for all edges of the polygon and a total number of crossings is calculated. Depending on whether an even or odd count of intersections are calculated, as described above, the relative position of the digital image location within the polygon is returned.

Decision block 650 is then executed. If the location signal is found to be within any of the exclusion zones, the process ends. If the location signal is not within any of the exclusion zones, the process continues to step 670. In step 670, the location signal is converted into geographic location meta-data information and is associated with the digital image by adding it to the digital image file stored during step 630. Alternately, the geographic location meta-data can be stored and associated with the digital image by creating a separate table or database of meta-data which is stored separately from the digital image file. By executing process 600, geographic location meta-data is not stored for digital images captured in one of the exclusion zones thereby enhancing the privacy of the user.

Figure 5:
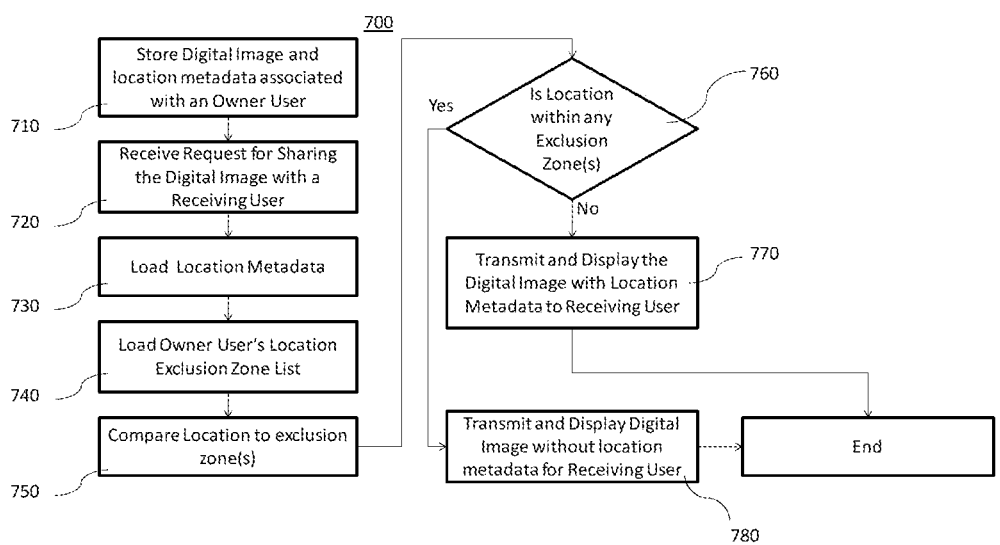
FIG. 5 is a flow chart of a process for sharing digital image files according to a second embodiment of the present disclosure.

Turning now to FIG. 5 and with reference to FIG. 1 to FIG. 3, a second embodiment will now be described. In the second embodiment, digital images files owned by an owner user are shared with a receiving user according to process 700 and is executed using an online photo-management service, such as online photo-management service 300. Steps of process 700 executed in connection with the on-line photo-management service may be constructed by one skilled in the art using combinations of Hypertext Markup Language (HTML), PHP scripts, Java scripts, and the like.

Process 700 begins with step 710 where the digital image files are stored on the storage memory 330 of the server(s) of online photo-management service 300 and associated in the database 310 with an owner user who uploaded or is otherwise assigned ownership of the digital image files. The digital image files are, for example, received through the network by the online photo-management service from the owner user who captured the digital image using a digital camera device. This association is accomplished with a database table shown here as table 2.

TABLE 2

| Digital Image File Association Table | | |
|---|---|---|
| UserID | FileID | FileName |
| User01 | 1 | 0000001.jpg |
| User01 | 2 | 0000002.jpg |
| User01 | 3 | 0000003.jpg |
| User01 | 4 | 0000004.jpg |
| User01 | 5 | 0000005.jpg |
| User02 | 6 | 00000F9.jpg |
| User02 | 7 | 00000FA.jpg |
| User03 | 8 | 00001C2.jpg |

The example of table 2 shown here is populated with eight exemplary records of data for purpose of illustration. Table 2 includes a field "UserID" which identifies an owner user for each digital image file. Additional information about each user may be stored in another database table, including information such as password, first and last name, and the like. Table 2 also includes a field called "FileID" which is a unique identifier produced by the database for each digital image file. Table 2 also includes a field called "FileName" which provides file information for each digital image file. This may include a simple file name, or a full path and file name, or another reference name or number. Various forms of file information and storage structure may be implemented by one skilled in the art. For example, the actual file name or path on the server may be composed of a combination of the UserID and filename such as "/user01/0000001.jpg".

In Step 710, metadata, including location metadata if available, is also stored in the database. The metadata is also preferably received by the online photo-management service from the owner and may be transmitted along with the digital image file, for example if automatically provided by a digital camera device, or it can be manually entered directly into an html web page file of the online photo-management service at a later time. Metadata can be stored in one or more tables such as table 3 shown here:

TABLE 3

Metadata Storage Table

| FileID | MetaDataName | Value |
|---|---|---|
| 1 | Date Picture Take | 4/14/2010 18:56 |
| 1 | Equipment Make | EASTMAN KODAK COMPANY |
| 1 | Camera Model | KODAK EASYSHARE Z1012 IS DIGITAL CAMERA |
| 1 | GPS Latitude | 43.121267 |
| 1 | GPS Longitude | −77.640319 |
| 2 | Date Picture Take | 4/15/2010 17:21 |
| 2 | Equipment Make | EASTMAN KODAK COMPANY |
| 2 | Camera Model | KODAK EASYSHARE Z1012 IS DIGITAL CAMERA |
| 2 | GPS Latitude | 43.258718 |
| 2 | GPS Longitude | −77.604464 |
| 3 | Date Picture Take | 4/17/2010 10:51 |
| 3 | Equipment Make | EASTMAN KODAK COMPANY |
| 3 | Camera Model | KODAK EASYSHARE Z1012 IS DIGITAL CAMERA |
| 3 | GPS Latitude | 43.208034 |
| 3 | GPS Longitude | −77.622327 |

The example of table 3 shown here is populated with fifteen exemplary records of data for purpose of illustration and simplicity. Additional metadata fields beyond those shown may also be recorded. Table 3 includes a field for the "FileID" the digital image files which is the same as the "FileID" previously associated in table 2 with an owner user. Table 3 also includes a field for "MetaDataName" which identifies a label for each metadata item. FileID and MetaDataName together form the primary keys for this table. Table 3 also includes a field titled "Value" for storing the value of each metadata item. Metadata items having the label "GPS Latitude" and "GPS Longitude" constitute the location metadata. In an alternate embodiment, the metadata may be stored in other ways than in a table form. For example, the metadata may be stored within the digital image file. If written within the digital image file, portions of the metadata such as the values for GPS Longitude and GPS Latitude will need to be deleted or cleared prior to transmitting the digital image file in certain circumstances as described later. In yet another alternate embodiment, the metadata may be stored in a combination of table form and file form.

Process 700 continues with step 720, where a request is received by the photo-management service from a requesting user requesting that a digital image stored in the database be shared with a receiving user. The owner user, requesting user, and receiving user may be three different users. Alternately, the requesting user may be the same as the owner user. Alternately, the receiving user may be the same user as the requesting user, or it may be a different user.

For example, according to this second embodiment, the request may come directly from the receiving user who has logged in to online photo-management service and has requested access to digital images owned by another user (the owner user). The request is received, for example, via a form or control in a web page encoded as a Hypertext Markup Language (HTML) file stored on the photo-management service server which is being accessed by the requesting user. The request may be either for a single image such as 0000001.jpg owned by user01 or for a plurality of images such as all images owned by user01.

Process 700 then continues with step 730 where the received request is then converted into a query on the server to retrieve and load into memory location metadata for each of the requested images, from the database 310. This operation may be achieved by executing SQL queries using a server side process, for example, using a PHP scripting language file.

Step 740 is performed where the digital image owner's exclusion zone list is loaded. The exclusion zones are also stored in database 310 using a table for managing exclusion zones such as shown here in table 4:

TABLE 4

Online Photo-Management Service Exclusion Zone List Table

| UserID | ZoneID | Caption | CenterPoint | Radius | NW | SE | Freeform |
|---|---|---|---|---|---|---|---|
| User01 | 1 | Home | 43.152421, −77.579979 | 5 | | | |
| User01 | 2 | School | 43.157980, −77.601628 | 3.5 | | | |
| User01 | 3 | Grandma's House | | | 43.204381, −77635504 | 43.201842, −77.626791 | |
| User01 | 4 | Work | | | | | 43.161828, −77.620030; 43.158682, −77.615778; 43.156601, −77.620723; 43.159040, −77.623894 |
| User02 | 5 | Zone 1 | 43.070148, −77282421 | 0.5 | | | |
| User02 | 6 | Zone 2 | 43.091352, −77544895 | 0.5 | | | |
| User03 | 7 | Home Zone | 43.161562, −77.443662 | 20 | | | |

The example of table 4 shown here is populated with seven exemplary records of data for purpose of illustration. Table 4 is similar to table 1 of the first embodiment and includes the same fields as previously described for table 1 as well as an additional field titled "UserID". The UserID field stores information for which user owns each of the exclusion zones thereby enabling the table to store exclusion zones for a plurality of users which access and store images with the photo-management service. "ZoneID" continues to service as primary key. Alternately, this table could be constructed by one skilled in the art such that UserID and ZoneID together serve as primary keys.

The exclusion zones of table 4 are preferably previously populated by each owner user using a graphic user interface such graphic user interface 500 previously shown. In this case, the graphic user interface is preferably displayed using an html web page operated by the online photo-management service 300 and is accessed, viewed, and operated by each owner user using a computer access device connected to the network.

During step 740, the exclusion zones for the owner user of the digital image file(s) which have been requested by the requesting user are loaded using an SQL query. This is done using a server side process, such as with a PHP script, so that the exclusion zone information is not visible to the requesting user.

Process 700 continues with step 750 where the location metadata loaded during step 730 is compared to the exclusion zones of the owner user loaded during step 740. Decision block 760 is then performed to determine if the location of the digital image is within any one or more exclusion zones of the owner user. If decision block 760 returns a true value, process 700 skips to step 780. In step 780 the digital image file is transmitted without location metadata to the receiving user, for example by rendering output HTML including a reference to the digital image file on the server which is displayed in a browser on a personal computer of the receiving user. If in the alternate embodiment previously described where the location metadata is stored in the digital image file, the location metadata is removed or cleared prior to transmitting the digital image file here in step 780.

If according to decision block 760 the location of the requested digital image is not within an exclusion zone, then data from the digital image file and location metadata is transmitted to the receiving user in step 770. The entire digital image file, or data derived from the digital image file such as reduced resolution version of the digital image can be transmitted. The transmission occurs by outputting the digital image file (or a derived digital image file) and location information to one or more HTML documents which are transmitted from the server across the network to the receiving user for display on electronic display device of the receiving user's personal computer or network access device. The location metadata and digital image data can be transmitted in separate steps, for example by including the digital image file with one HTML document and including the location metadata with a different HTML document. Transmission of the location metadata can also occur simultaneously with the transmission of the digital image file by appending the location metadata to the digital image file.

In step 770 the location metadata is displayed to the receiving user. This display step can occur in a variety of different forms. For example, the location information can be output to an HTML document in text form viewable to the receiving user. Alternately, the location metadata can be displayed in graphic format by plotting an icon on a map user interface within the output HTML document, such as that currently provided by Google Maps (R) or similar services. The location metadata and digital image data can be displayed together in a single HTML document or separately in multiple HTML documents.

Figure 7:
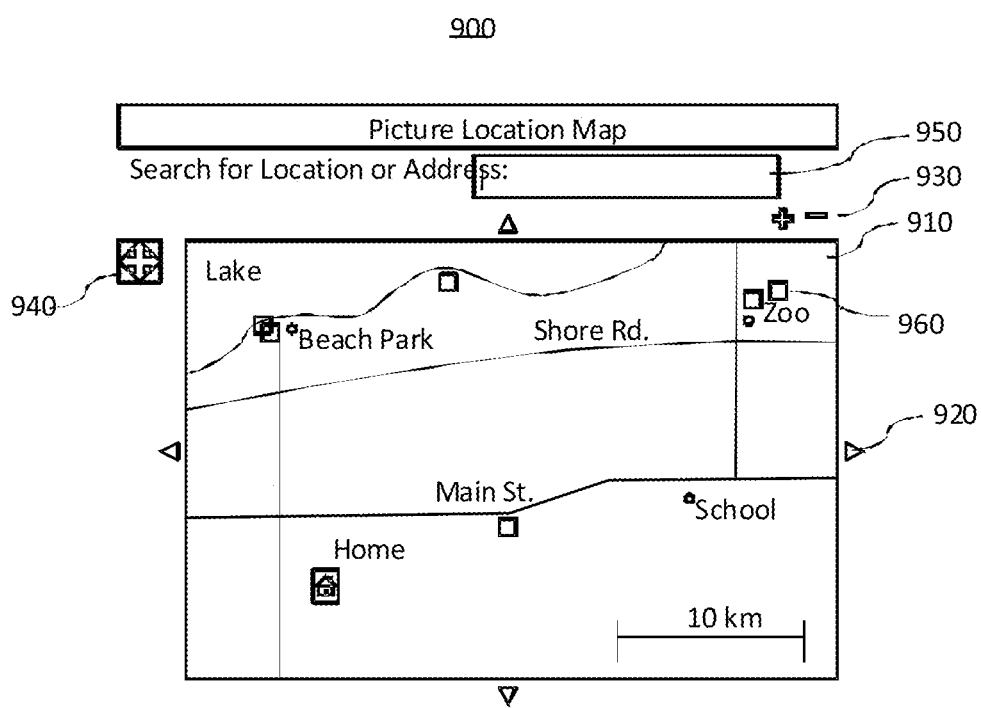
FIG. 7 is an illustration of a graphical user interface for displaying location metadata of digital images in a map format zones according to the present disclosure.

A useful graphic interface useful for displaying the location metadata in map form is shown in FIG. 7 as graphic user interface 900. Graphic user interface 900 can be encoded within an HTML web page for display on the receiving user's personal computer or it may be generated by software resident in the receiving user's computer which receives the location metadata from the online photo-management service 300. Graphic user interface 900 contains a map region 910. Map region 910 displays maps which may be either preloaded into memory or may be downloaded from an online map service provider over the network. Graphic user interface 900 also contains several controls to enable the user to navigate to different locations such as scroll arrows 920, zoom in and out controls 930, pan control 940, and location search input box 950. Graphic user interface 900 also contains image location icons 960 which are positioned in various locations in map region 910 and represent retrieve digital image with location metadata corresponding to that position. Image location icons 960 are shown represented as squares in FIG. 7 for purpose of simplicity in illustration but may actually be digital image icons showing a smaller (thumbnail) view of the represented image. Alternately, image location icons 960 may be a graphical icon such as a camera picture, postcard picture, push-pin picture, or the like. Image location icons 960 can represent a single digital image and when the icon is activated by clicking or double clicking with an input device, the represented image is retrieved and displayed. Alternately image location icons 960 can represent a group of digital images having the same location or a proximate location. In this case activation of the image location icon causes a zooming operation of map region 910 on that location, retrieves and displays the represented digital image(s) or both by detecting one of a click or a double click on the icon from an input device. As previously described, digital images with location metadata representing a location within an exclusion zone of the owner user are not represented on the graphic user interface 900 as viewed by the receiving user.

Returning to FIG. 5, process 700 has thus far been described as operated using photo-management service, however, process 700 may also be executed in several alternate embodiments which will now be described. In an alternate embodiment to the second embodiment, process 700 can be executed on a personal computer having photo-management software loaded locally and connected to a network, such as computer access device 400 connected to network 200. In this alternate embodiment, the owner user is the same as the requesting user and is operating the personal computer. The owner user stores digital images with location metadata on the personal computer (step 710) which are associated with the owner user by the fact that they are stored on a computer associated with the owner user or with a user profile on the computer associated with the owner user. A request is received by the photo-management software that a digital image be transmitted to a receiving user (step 720) for example by requesting that an email containing the image be transmitted to the receiving user. The location metadata and exclusion zone lists are loaded in steps 730 and 740 respectively. The exclusion zone list is stored on the local personal computer using table 4 previously described. Steps 750 and 760 operate as previously described. If the image location is within an exclusion zone, then the digital image file is transmitted, for example as an email attachment, without any location metadata written in the digital image or in the email which is then displayed on a computer of the receiving user per step 780. If the image location is not within an exclusion zone, then the digital image file is transmitted, for example as an email attachment, with location metadata written in the digital image or in the email which are then both then displayed on a computer of the receiving user per step 770.

In yet another alternate embodiment, process 700 can be executed directly on a digital camera device connected to a network such as digital camera device 100 connected to network 200. In this alternate embodiment, the exclusion zone list is stored with the internal storage memory 125 of the digital camera device. The digital image is transmitted to a receiving user via Multimedia Messaging Service (MMS), email or the like along with the location metadata only if not located within an exclusion zone per decision block 760.

Figure 6:
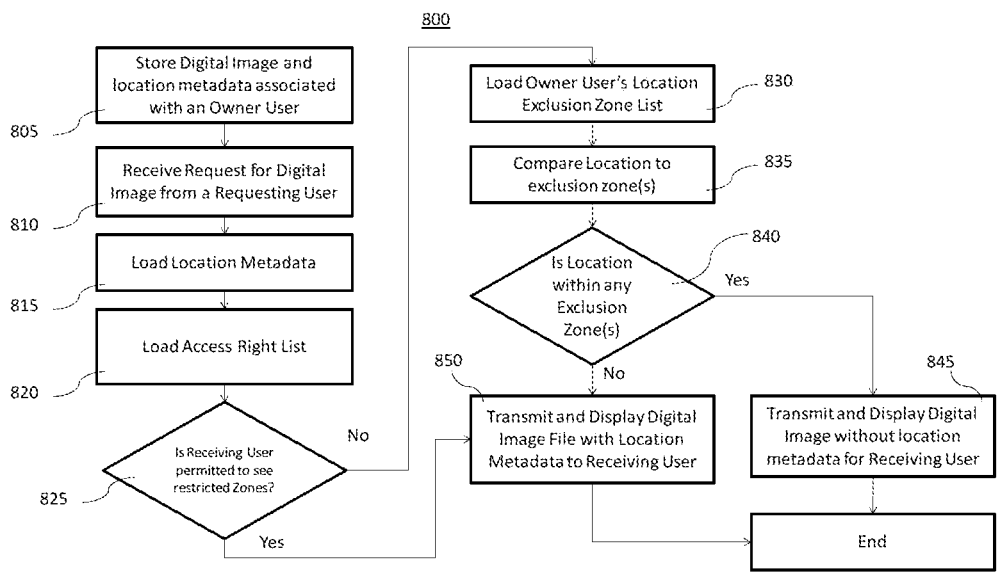
FIG. 6 is a flow chart of a process for sharing digital image files according to a third embodiment of the present disclosure.

Turning now to FIG. 6 and with reference to FIG. 1 to FIG. 3, a third embodiment will now be described. The third embodiment is implemented according to process 800. In the third embodiment, like the second embodiment described above, digital image files owned by an owner user are shared with a receiving user. In the third embodiment, different receiving users are either provided or denied access to location metadata depending on the preference of the owner user.

Process 800 begins with step 805 where digital images files having associated location metadata are stored on the storage memory 330 of the server(s) of the photo-management service 300 and associated in the database 310 with an owner user who uploaded or is otherwise assigned ownership of the digital image files. This storage and association may be accomplished as described above in the second embodiment using tables such as table 2 and table 3.

Process 800 continues with step 810, where a request is received by the photo-management service from a requesting user requesting that a digital image stored in the database be shared with a receiving user. Again, the owner user, requesting user, and receiving users may be three different users or the receiving user may be the same as the requesting user or the requesting user may be the same as the owner user. As previously described in the second embodiment, the request is received, for example, via a form or control in a web page encoded as a Hypertext Markup Language (HTML) file stored on the photo-management service server which is being accessed by the requesting user.

Process 800 then continues with step 815 where the received request is then converted into a query on the server to retrieve and load into memory location metadata for the requested digital image from the database 310. This operation may be achieved by executing SQL queries using a server side process, for example, using a PHP scripting language file.

Process 800 then executes step 820 where an access rights list is loaded. Access rights are a list of users or groups of users who are permitted to receiving location metadata for digital images located within an exclusion zone of the owner user. Access rights are preferably previously established by the owner user and stored in a table on the storage memory 330 of the server(s) of the online photo-management service 300 in a table such as table 5 shown here:

TABLE 5

Access rights list table

| OwnerUser | PermittedUser |
|---|---|
| User01 | User02 |
| User01 | User03 |
| User02 | User01 |
| User02 | User04 |
| User04 | User05 |

Table 5 stores the access rights for all users of the online photo-management service using two fields; an "OwnerUser" and "PermittedUser". Table 5 is populated with exemplary data records for purpose of illustration of the present disclosure. For example, "User02" is permitted to receive location meta-data from digital images located with an exclusion zone of the "User01". "User01" has also been given access rights to receive location meta-data from digital images located with an exclusion zone of the "User02". "User04" has also been given access rights to receive location meta-data from digital images located with an exclusion zone of the "User02" but "User02" has not been given access rights receive location meta-data from digital images located with an exclusion zone of the "User04". In an alternate embodiment, groups of users such as "Friends", "Family", "Coworkers", etc. can be established and given access rights. In yet another alternate embodiment, access rights may be established differently for each exclusion zone, for example by instead using a table with the fields "ZoneID" and "PermittedUser" to define which users are permitted to view images in each zone. The zones were previously also associated with an owner user in Table 4. Combinations of these alternate embodiments may also be applied.

During step 820, the access rights for the owner user of the digital image file(s), which have been requested by a requesting user, are loaded using an SQL query. This is done using a server side process, such as with a PHP script, so that the exclusion zone information is not visible to the requesting user.

Decision block 825 is then executed where the access rights for the receiving user to the location metadata of digital images within exclusion zones of the owner user are determined. If the receiving user is listed in table 4 as having access rights to receiving location metadata of digital images within exclusion zones of the owner user, the process 800 skips to step 850, where the digital image file and location metadata are transmitted and displayed to the receiving user, for example by generating one or more HTML output documents with the digital images and a map interface such as graphic user interface 900 of FIG. 7. If however, the receiving user is not listed in table 4 as having access rights to receiving location metadata of digital images within exclusion zones of the owner user, then process 800 proceeds to step 830.

In step 830, the exclusion zones for the owner user of the digital image file(s) which have been requested by the requesting user are loaded using an SQL query. The exclusion zones are established as previously described in the second embodiment using a table such as table 4. Loading is done using a server side process, such as with a PHP script, so that the exclusion zone information is not visible to the requesting user. Next, step 835 is performed where the location metadata loaded during step 815 is compared to the exclusion zones of the owner user loaded during step 830. Decision block 840 is then performed to determine if the location of the digital image is within any one or more exclusion zones of the owner user. If decision block 840 returns a true value, process 800 skips proceed to step 845 where the digital the digital image file is transmitted without location metadata to the receiving user, for example by rendering output HTML including a reference to the digital image file on the server which is displayed in a browser on a personal computer of the receiving user. If location metadata is stored in the digital image file, the location metadata is removed or cleared prior to transmitting the digital image file here in step 845. If, on the other hand, according to decision block 840 the location of the requested digital image is not within an exclusion zone, then the digital image file and location metadata is transmitted to the receiving user in step 850, for example by generating one or more HTML output documents with the digital images and a map interface such as graphic user interface 900 of FIG. 7.

The disclosure has been described in detail with particular reference to certain preferred embodiments thereof, but it will be understood that variations and modifications can be effected within the spirit and scope of the disclosure.

PARTS LIST

100 Camera Processing System
110 Processor
120 Memory Card
125 Storage
130 Memory
140 Display
150 Speaker
160 Sensor
170 Module
180 Module
200 Network
300 Server
310 Database
320 Processor
330 Storage
400 Computer
410 Memory
420 Processor
430 Display
500 GUI
510 Map
520 Scroll
530 Zoom
540 Pan
550 Search Box
560*a-b* Exclusion Zone
570*a-x* Controls
600 Process
610 Step
620 Step
630 Step
640 Step
650 Step
660 Decision
670 Step
700 Process
710 Step
720 Step
730 Step
740 Step
750 Step
760 Decision
770 Step
780 Step
800 Process
805 Step
810 Step
815 Step
820 Step
825 Step
830 Step
835 Step
840 Decision
845 Step
850 Step
900 GUI
910 Map
920 Scroll
930 Zoom
940 Pan
950 Search Box
960 Icon

What is claimed is:

1. A method for displaying digital images having location metadata, comprising:
   storing, in one of at least one digital memory of a processor-based photo management unit, a digital image file associated with a first user;
   storing, in any of the at least one digital memory of the processor-based photo management unit, geographic location metadata for the digital image file;
   storing, in the processor-based photo management unit, one or more geographic exclusion zones associated with the first user;
   automatically determining, by the processor-based photo management unit, whether a geographic location of the geographic location metadata of the digital file is within any of the one or more geographic exclusion zones by loading the one or more geographic exclusion zones and comparing the geographic location metadata for the digital image file to each of said one or more geographic exclusion zones; and
   if the geographic location is within any of the one or more geographic exclusion zones, transmitting, by the processor-based photo management unit, digital image data of the digital image files to a computer associated with a second user, otherwise
   if the geographic location is not within any of the one or more geographic exclusion zones, transmitting, by the processor-based photo management unit, digital image data of the digital image files and the geographic location metadata to the computer associated with the second user.

2. The method of claim 1, further comprising receiving, by the processor, a user-defined geographic exclusion zone.

3. The method of claim 1, wherein determining that the geographic location metadata of the digital image file is within the geographic exclusion zone comprises determining that the geographic location metadata of the digital image file defines a location that is within an area defined by the geographic exclusion zone.

4. The method of claim 1, further comprising:
   defining a region on a digital display of a geographic map; and
   storing the defined region as one of the geographic exclusion zones associated with the first user.

5. The method of claim 1, further comprising, if the geographic location is within any of the one or more geographic exclusion zones, removing, by the processor, the geographic location metadata from the digital image file.

6. The method of claim 1, wherein the at least one geographic exclusion zone has a circular shape.

7. The method of claim 6, wherein determining that the geographic location metadata of the digital image file is within the geographic exclusion zone comprises calculating a great arc distance using a Haversine formula.

8. The method of claim 1, wherein the at least one geographic exclusion zone has a polygonal shape.

9. The method of claim 8, wherein determining that the geographic location metadata of the digital image file is within the geographic exclusion zone comprises calculating a line starting from the geographic location metadata and determining how many sides of the at least one geographic exclusion zone are crossed using a Jordan curve theorem.

10. The method of claim 1, wherein the at least one geographic exclusion zone has a rectangular shape, and further wherein the determining that the geographic location metadata of the digital image file is within the geographic exclusion zone comprises:
 determining whether a longitude of the geographic location metadata of the digital file is between a longitude of a first coordinate and a second coordinate of the geographic exclusion zone, wherein:
  the first coordinate and the second coordinate are both different corners of the at least one geographic exclusion zone,
  the first coordinate is at a corner of two sides of the at least one geographic exclusion zone where the two sides intersect with each other, and
  the two sides do not intersect with the second coordinate; and
 determining whether a latitude of the geographic location metadata of the digital file is between a latitude of the first coordinate and the second coordinate of the geographic exclusion zone.

11. A method for transmitting digital images with location metadata between a plurality of users including:
 providing a database having a plurality of users;
 receiving, by a processor-based photo management unit, a digital image file from a first user;
 receiving, by the processor-based photo management unit, geographic location metadata for the digital image file;
 receiving, by the processor-based photo management unit, one or more geographic exclusion zones associated with the first user;
 automatically determining, by the processor-based photo management unit, whether a geographic location of the geographic location metadata of the digital file is within any of the one or more geographic exclusion zones by loading the one or more geographic exclusion zones and comparing the geographic location metadata for the digital image file to each of said one or more geographic exclusion zones; and
 if the geographic location is within any of the one or more geographic exclusion zones, transmitting, by the processor-based photo management unit, digital image data of the digital image file to a second user, otherwise
 if the geographic location is not within any of the one or more geographic exclusion zones, transmitting, by the processor-based photo management unit, digital image data of the digital image file and the geographic location metadata for the digital file to the second user.

12. The method of claim 11, further including causing the digital image to be displayed on a digital electronic display device.

13. The method of claim 12, further including causing transmitted geographic location metadata for the digital image file to be displayed on the digital electronic display device.

14. The method of claim 11, further including storing at least a portion of the transmitted digital image data on a digital memory device.

15. The method of claim 14, further including storing at least a portion of any transmitted geographic location metadata of the digital image file on the digital memory device.

16. The method of claim 11, further comprising receiving, by the processor, a user defined geographic exclusion zone.

17. The method of claim 11, wherein determining that the geographic location metadata of the digital image file is within the geographic exclusion zone comprises determining that the geographic location metadata of the digital image file defines a location that is within an area defined by the geographic exclusion zone.

18. The method of claim 11, further comprising, if the geographic location is within any of the one or more geographic exclusion zones, removing, by the processor, the geographic location metadata from the digital image file.

19. The method of claim 11, wherein the at least one geographic exclusion zone has a circular shape.

20. The method of claim 11, wherein the at least one geographic exclusion zone has a polygonal shape.

* * * * *